United States Patent
You et al.

(10) Patent No.: US 12,096,504 B2
(45) Date of Patent: Sep. 17, 2024

(54) METHOD AND DEVICE FOR ACTIVATING OR DEACTIVATING TRANSMISSION CONFIGURATION INDICATOR STATE

(71) Applicant: GUANGDONG OPPO MOBILE TELECOMMUNICATIONS CORP., LTD., Guangdong (CN)

(72) Inventors: Xin You, Guangdong (CN); Cong Shi, Guangdong (CN); Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 325 days.

(21) Appl. No.: 17/562,013

(22) Filed: Dec. 27, 2021

(65) Prior Publication Data
US 2022/0124861 A1  Apr. 21, 2022

Related U.S. Application Data

(63) Continuation of application No. PCT/CN2019/126064, filed on Dec. 17, 2019.

(51) Int. Cl.
*H04W 76/20* (2018.01)
*H04W 72/02* (2009.01)
*H04W 72/1263* (2023.01)
*H04W 72/20* (2023.01)
*H04W 80/02* (2009.01)

(52) U.S. Cl.
CPC .......... *H04W 76/20* (2018.02); *H04W 72/02* (2013.01); *H04W 72/1263* (2013.01); *H04W 72/20* (2023.01); *H04W 80/02* (2013.01)

(58) Field of Classification Search
None
See application file for complete search history.

(56) References Cited

U.S. PATENT DOCUMENTS

2020/0344729 A1* 10/2020 Park ...................... H04L 5/0053
2020/0350972 A1* 11/2020 Yi .............................. H04L 1/12
(Continued)

FOREIGN PATENT DOCUMENTS

| CN | 109792745 | 5/2019 |
| CN | 109845371 | 6/2019 |

(Continued)

OTHER PUBLICATIONS

"International Search Report (Form PCT/ISA/210) of PCT/CN2019/126064," mailed on Sep. 8, 2020, with English translation thereof, pp. 1-6.

(Continued)

*Primary Examiner* — Anh Vu H Ly
(74) *Attorney, Agent, or Firm* — JCIP GLOBAL INC.

(57) ABSTRACT

Embodiments of the application provides a method for activating or deactivating a TCI state. The method includes steps as follows. First information is obtained. The first information is used to determine at least one TRP corresponding to a MAC CE. A TCI state corresponding to the at least one TRP is activated or deactivated according to the MAC CE. The first information indicates the TRP corresponding to the MAC CE, thereby solving the problem that terminal device cannot determine which TCI state corresponding to the TRP is activated or deactivated after receiving the MAC CE.

9 Claims, 3 Drawing Sheets

(56) References Cited

U.S. PATENT DOCUMENTS

| | | | | |
|---|---|---|---|---|
| 2020/0351841 A1* | 11/2020 | Cirik | ............... | H04W 48/08 |
| 2021/0050968 A1* | 2/2021 | Yi | ..................... | H04L 5/0048 |
| 2021/0105780 A1* | 4/2021 | Jin | ..................... | H04W 76/27 |
| 2021/0385832 A1* | 12/2021 | Zhang | ............ | H04W 72/1263 |

FOREIGN PATENT DOCUMENTS

| | | | | |
|---|---|---|---|---|
| CN | 110035503 | | 7/2019 | |
| CN | 110351850 | | 10/2019 | |
| CN | 110366865 | | 10/2019 | |
| CN | 110474724 | | 11/2019 | |
| WO | 2019051242 | | 3/2019 | |
| WO | 2019153347 | | 8/2019 | |
| WO | WO-2021090204 A1 * | | 5/2021 | ............ H04L 5/001 |
| WO | WO-2021095025 A1 * | | 5/2021 | ........... H04L 5/0035 |

OTHER PUBLICATIONS

"Written Opinion of the International Searching Authority (Form PCT/ISA/237) of PCT/CN2019/126064," mailed on Sep. 8, 2020, with English translation thereof, pp. 1-5.

3GPP, "Technical Specification, 3rd Generation Partnership Project; Technical Specification Group Radio Access Network; NR; Medium Access Control (MAC) protocol specification (Release 15)," 3GPP TS 38.321 V15.4.0, Dec. 2018, pp. 1-77.

3GPP, "Technical Specification, 3rd Generation Partnership Project; Technical Specification Group Radio Access Network; NR; Radio Resource Control (RRC) protocol specification (Release 15)," 3GPP TS 38.331 V15.5.1, Apr. 2019, pp. 1-491.

Office Action of Europe Counterpart Application No. 19956439.4, issued on Feb. 17, 2023, pp. 1-9.

"Search Report of Europe Counterpart Application No. 19956439. 4", issued on Jun. 23, 2022, p. 1-p. 10.

ZTE, "Further details on multi-beam/TRP operation," 3GPP TSG RAN WG1 Meeting #98 R1-1908194, Aug. 2019, pp. 1-17.

ZTE, "On multi-PDCCH design for multi-TRP," 3GPP TSG RAN WG1 #97 R1-1906242, May 2019, pp. 1-4.

Office Action of China Counterpart Application, Application No. 202111367003.5, with English translation thereof, issued on Apr. 4, 2023, pp. 1-11.

"Summons to Attend Oral Proceedings of Europe Counterpart Application, Application No. 19956439.4", issued on May 11, 2023, pp. 1-7.

* cited by examiner

METHOD AND DEVICE FOR ACTIVATING OR DEACTIVATING TRANSMISSION CONFIGURATION INDICATOR STATE

CROSS-REFERENCE TO RELATED APPLICATION

This application is a continuation of international PCT application serial no. PCT/CN2019/126064, filed on Dec. 17, 2019. The entirety of the above-mentioned patent application is hereby incorporated by reference herein and made a part of this specification.

BACKGROUND

Technology Field

The application relates to the field of communications, and in particular, to a method and a device for activating or deactivating a transmission configuration indicator state.

Description of Related Art

The $5^{th}$ generation (5G) mobile communication system supports high-frequency communication. As the operating frequency becomes higher, the path loss during transmission may increase, resulting in a decrease in signal coverage. One solution to the problem is to use multiple beam transmission on the basis of a large-scale antenna array to increase the signal coverage.

A multiple beam transmission scheme is a scheme based on multiple physical downlink control channels (PDCCHs). In the scheme, multiple transmission/reception points (TRPs), multiple antenna panels, or multiple beams simultaneously transmit downlink data to terminal device.

In the scheme based on multiple PDCCHs, network device can activate or deactivate the transmission configuration indicator (TCI) state through a medium access control (MAC) control element (CE). Since the network device simultaneously transmits downlink data to the terminal device through multiple TRPs, after the terminal device receives the MAC CE, it cannot determine which TCI state corresponding to the TRP the MAC CE activates or deactivates.

SUMMARY

The application provides a method and a device for activating or deactivating the TCI state, so that the terminal device can determine which TCI state corresponding to the TRP the MAC CE activates or deactivates.

In one aspect, a method for activating or deactivating a TCI state is provided. The method includes steps as follows. First information is obtained. The first information is used to determine at least one TRP corresponding to a MAC CE. The TCI state corresponding to the at least one TRP is activated or deactivated according to the MAC CE.

The MAC CE is used to activate or deactivate the TCI state, and the first information indicates the TRP corresponding to the MAC CE, thereby solving the problem that the terminal device cannot determine which TCI state corresponding to the TRP is activated or deactivated after receiving the MAC CE.

In a second aspect, another method for activating or deactivating a TCI state is provided. The method includes steps as follows. First information is sent. The first information is used by terminal device to determine at least one TRP corresponding to a MAC CE, so that the terminal device activates or deactivates the TCI state corresponding to the at least one TRP according to the MAC CE.

The MAC CE is used to activate or deactivate the TCI state, and the first information indicates the TRP corresponding to the MAC CE, thereby solving the problem that the terminal device cannot determine which TCI state corresponding to the TRP is activated or deactivated after receiving the MAC CE.

In a third aspect, a device for activating or deactivating a TCI state is provided. The device can implement functions corresponding to the method in the first aspect. The functions can be implemented by hardware or by hardware executing corresponding software. The hardware or software includes one or more units or modules corresponding to the functions.

In one possible design, the device is terminal device or a chip. The device may include a processing unit and a transceiver unit. When the device is terminal device, the processing unit may be a processor, and the transceiver unit may be a transceiver; the terminal device may further include a storage unit, and the storage unit may be a memory; the storage unit is used to store instructions, and the processing unit executes the instructions stored in the storage unit, so that the terminal device executes the method in the first aspect. When the device is a chip in terminal device, the processing unit may be a processor, and the transceiver unit may be an input/output interface, a pin, a circuit, and the like; the processing unit executes the instructions stored by the storage unit, so that the terminal device including the chip executes the method in the first aspect, and the storage unit may be a storage unit (e.g., a register, a cache, and the like) in the chip and may also be a storage unit (e.g., read-only memory, random access memory, and the like) disposed outside the chip in the terminal device.

In a fourth aspect, a device for activating or deactivating a TCI state is provided. The device can implement functions corresponding to the method in the second aspect. The functions can be implemented by hardware or by hardware executing corresponding software. The hardware or software includes one or more units or modules corresponding to the functions.

In one possible design, the device is network device or a chip. The device may include a processing unit and a transceiver unit. When the device is network device, the processing unit may be a processor, and the transceiver unit may be a transceiver; the network device may further include a storage unit, and the storage unit may be a memory; the storage unit is used to store instructions, and the processing unit executes the instructions stored in the storage unit, so that the network device executes the method in the second aspect. When the device is a chip in network device, the processing unit may be a processor, and the transceiver unit may be an input/output interface, a pin, a circuit, or the like; the processing unit executes the instructions stored by the storage unit, so that the network device including the chip executes the method in the second aspect, and the storage unit may be a storage unit (e.g., a register, a cache, and the like) in the chip and may also be a storage unit (e.g., read-only memory, random access memory, and the like) located outside the chip in the network device.

In a fifth aspect, a computer-readable storage medium is provided, and the computer-readable storage medium stores a computer program. When the computer program is executed by a processor, the processor executes the method in the first aspect.

In a sixth aspect, a computer-readable storage medium is provided, and a computer program is stored in the computer-readable storage medium. When the computer program is executed by a processor, the processor executes the method in the second aspect.

In a seventh aspect, a computer program product is provided. The computer program product includes computer program codes, and when the computer program codes are executed by a processor, the processor executes the method in the first aspect.

In an eighth aspect, a computer program product is provided. The computer program product includes computer program codes, and when the computer program codes are executed by a processor, the processor executes the method in the second aspect.

In a ninth aspect, a computer program is provided. When the computer program is run on a computer, the computer executes the method in the first aspect.

In a tenth aspect, a computer program is provided. When the computer program is run on a computer, the computer executes the method in the second aspect.

DESCRIPTION OF THE EMBODIMENTS

The technical solutions in the embodiments of the application are illustrated below with reference to the drawings in the embodiments of the application. Obviously, the illustrated embodiments are a part of the embodiments of the application but not all of the embodiments. Based on the embodiments in the application, all other embodiments obtained by those ordinary skill in the art without creative work shall fall within the protection scope of the application.

Figure 1:
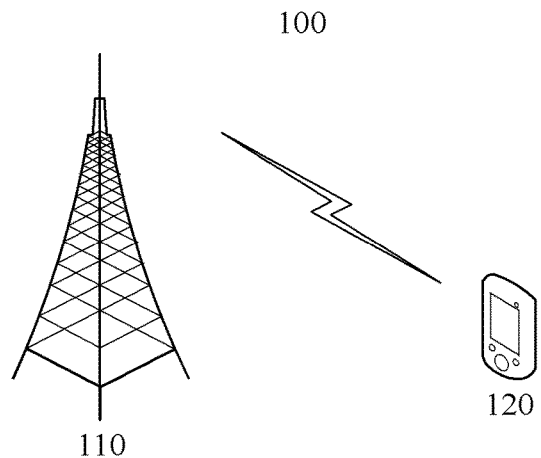
FIG. 1 is a schematic view of a communication system suitable for the application.

First, the application scenario of the application is introduced. FIG. 1 is a schematic view of a communication system suitable for the application.

A communication system 100 includes network device 110 and terminal device 120. The terminal device 120 communicates with the network device 110 through electromagnetic waves.

In the application, the terminal device 120 may include various handheld devices with wireless communication functions, vehicle-mounted devices, wearable devices, computing devices, or other processing devices connected to a wireless modem, such as user equipment (UE), mobile station (MS), soft terminal, home gateway, set-top box, and the like defined by the 3rd generation partnership project (3GPP).

The network device 110 may be a base station defined by 3GPP, such as a base station (gNB) in a 5G mobile communication system. The network device 110 may also be a non-3GPP access network device, such as an access gateway (AG). The network device 110 may also be a relay station, an access point, a vehicle-mounted device, a wearable device, and other types of devices.

The communication system 100 is only an example, and the communication system applicable to the application is not limited thereto. For example, the number of network device and terminal device included in the communication system 100 may also be other numbers.

In the new radio (NR) system, network device can use analog beams to transmit downlink data. Before performing analog beamforming, the network side needs to determine the beam used through the downlink beam management process. The downlink beam management can be based on the channel state information reference signal (CSI-RS) or synchronization signal/physical broadcast channel block (SSB). The network device can send multiple SSBs or multiple CSI-RSs for beam management, and the terminal device performs measurement based on the SSBs or CSI-RSs, selects several SSBs or CSI-RSs with better reception quality, and reports the corresponding SSB index or CSI-RS resource index and the corresponding reference signal receiving power (RSRP) to the network device. The network device can determine a better SSB or CSI-RS according to the report of the terminal device and use the sending beam as the sending beam for downlink transmission to transmit the downlink signal.

In order to improve the receiving performance when receiving the downlink signal, the terminal device can use the characteristics of the transmission environment of the data transmission to improve the receiving algorithm. For example, the terminal device can use the statistical characteristics of the channel to optimize the design and parameters of the channel estimator. In the 5G mobile communication system, the characteristics of the transmission environment are implicitly expressed through quasi co-location (QCL) information.

Figure 2:
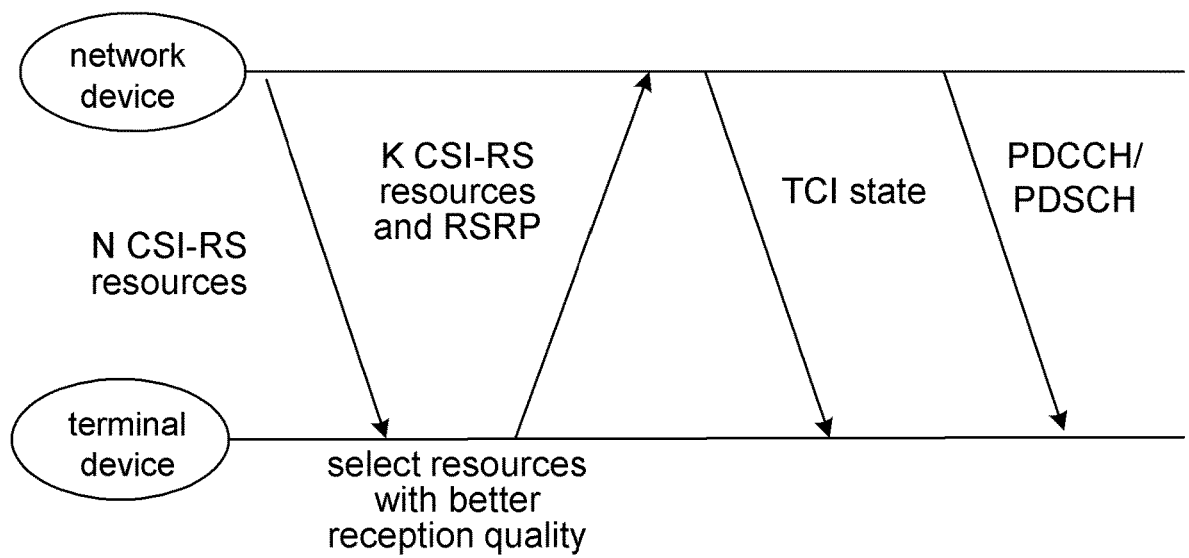
FIG. 2 is a schematic view illustrating a downlink beam management process.

FIG. 2 is a schematic view illustrating a downlink beam management process by taking the CSI-RS as an example.

The network device sends N CSI-RSs to the terminal device on the N CSI-RS resources; after receiving the N CSI-RSs, from the N CSI-RSs, the terminal device selects K CSI-RS resources with better measurement results and sends the index of the K CSI-RS resources and the corresponding measurement results (RSRP) to the network device; the network device can determine a better CSI-RS resource from the K CSI-RS resources according to the measurement result, and when sending the CSI-RSs on the CSI-RS resources, the beam is used as the beam to send the PDCCH or the physical downlink shared channel (PDSCH). If the downlink transmission corresponds to a different beam (i.e., TRP or antenna panel), the transmission environment characteristics of the downlink transmission may also change. Therefore, when the network device transmits the PDCCH or PDSCH, the QCL information is indicated to the terminal device through the TCI state.

A TCI state can include the following:
TCI state identifier (ID) used to identify a TCI state;
QCL information 1;
QCL information 2 (optional).
QCL information may include the following:
a configuration type of QCL, which can be one of QCL type A, QCL type B, QCL type C, and QCL type D; and
a configuration of a QCL reference signal including the ID of the cell where the reference signal is located, the ID of the bandwidth part (B W P) where the reference signal is located, and the ID of the reference signal. The ID of the reference signal can be a CSI-RS resource ID or an SSB index.

If both QCL information 1 and QCL information 2 are configured, the information type of at least one of QCL information 1 and QCL information 2 must be one of QCL type A, QCL type B, and QCL type C, and the other QCL information must be QCL type D.

The meanings of the different QCL types are as follows.

QCL type A: Doppler frequency shift, Doppler propagation, average delay and delayed propagation.

QCL type B: Doppler frequency shift and Doppler propagation.

QCL Type C: Doppler frequency shift and average delay.

QCL type D: Spatial Rx parameter.

If the network device configures the downlink channel or the QCL reference signal of the downlink signals as SSB or CSI-RS resources through the TCI state, and the QCL type is configured as type A, type B or type C, then the terminal device may assume that the large-scale parameters of the downlink signal and the SSB or the CSI-RS resource are the same, and thus receiving parameters the same as the large-scale parameters are used for reception, and the large-scale parameters are determined through the configuration of the QCL type.

Similarly, if the network device network device configures the QCL reference signal of the downlink signal as SSB or CSI-RS resources through the TCI state, and the QCL type is configured as type D, then the terminal device may use a receiving beam (i.e., the Spatial Rx parameter) the same as that used to receive SSBs or CSI-RSs to receive the downlink signal. Generally, the downlink signal and its SSB or CSI-RS resources are sent by the same beam (i.e., TRP or antenna panel) on the network side, and the network device is usually configured with different TCI states.

For the downlink control channel, the TCI state can be indicated by means of radio resource control (RRC) signaling or RRC signaling+MAC signaling.

Figure 3:
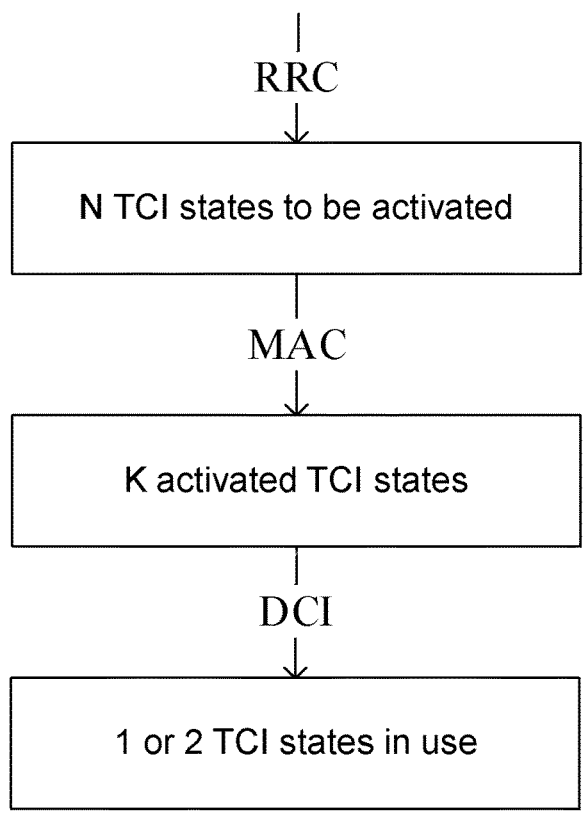
FIG. 3 is a schematic view of a method for determining a TCI state.

For the downlink data channel, the set of available TCI states can be indicated by RRC signaling, some of the TCI states can be activated by MAC signaling, and finally, one or two TCI states are indicated from the activated TCI state through the TCI state indication field in the downlink control information (DCI) for the PDSCH scheduled by the DCI. The process is illustrated in FIG. 3.

In the application, a transmission scheme based on multiple PDCCHs may also be referred to as a multiple DCI transmission scheme. Both description methods are applicable to each other.

In the subsequent paragraphs, the method for activating or deactivating the TCI state provided by the application is illustrated in detail.

Figure 4:
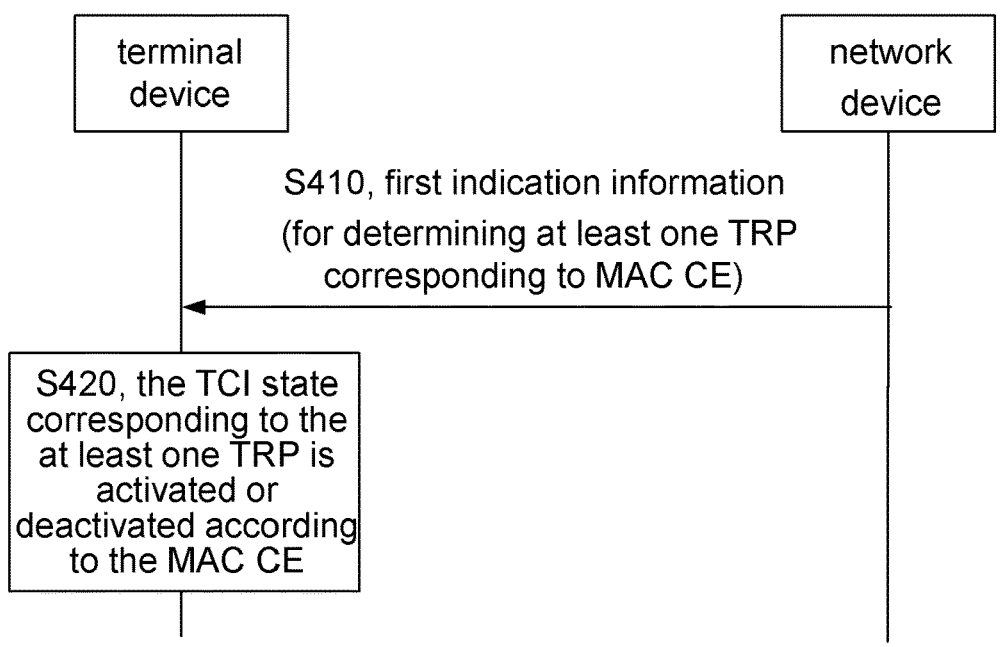
FIG. 4 is a schematic view of a method for activating or deactivating a TCI state according to the application.

As shown in FIG. 4, the method includes:

S410: The terminal device obtains first information, and the first information is used to determine at least one TRP corresponding to the MAC CE.

Correspondingly, the network device sends the first information.

In the transmission scheme based on multiple PDCCHs, different TRPs may correspond to the same TCI state. Therefore, the terminal device needs to determine the TRP corresponding to the TCI state to be activated or deactivated.

The terminal device may determine at least one TRP corresponding to the MAC CE according to the first information, the MAC CE is used to activate or deactivate the TCI state, and the terminal device determines at least one TRP corresponding to the MAC CE, that is, the TRP corresponding to the TCI state to be activated or to be deactivated is determined. Subsequently, the steps as follows can be performed.

S420: The terminal device activates or deactivates the TCI state corresponding to the at least one TRP according to the MAC CE.

Deactivating the TCI state means that the TCI state is no longer used to receive signals transmitted by the TRP, and activating the TCI state means that the TCI state is used to receive signals transmitted by the TRP.

The first information indicates at least one TRP corresponding to the MAC CE, which solves the problem that the terminal device cannot determine which TCI state corresponding to the TRP is activated or deactivated after receiving the activation signaling or deactivation signaling (i.e., MAC CE) of the TCI state.

In addition to determining the TRP corresponding to the MAC CE, the first information may also indicate the activation or deactivation of the TCI state as well as may have other functions.

In the subsequent paragraphs, the method for activating or deactivating the TCI state provided by the application is further introduced.

As an optional embodiment, the first information is an ID of a control resource set (CORESET) pool, and the CORESET pool is used to schedule MAC CEs.

In the embodiment, the CORESET pool includes at least one CORESET, the terminal device receives scheduling information through the CORESET in the CORESET pool, and the scheduling information is used to schedule the MAC CE. For example, the scheduling information is DCI, and the terminal device receives the MAC CE at the time-frequency position indicated by the DCI.

There is an association relationship between the ID of the CORESET pool and at least one TRP. If the MAC CE indicates to activate a first TCI state, the terminal device determines to activate the first TCI state corresponding to a first TRP based on the association relationship; if the MAC CE indicates to deactivate the first TCI state, the terminal device deactivates the first TCI state corresponding to the first TRP based on the association relationship. The first TRP is an example of at least one TRP in S410, and the first TCI state is an example of a TCI state corresponding to the at least one TRP.

The association relationship may be configured by the network device or may be preset (e.g., defined by the communication protocol).

As another optional embodiment, the first information includes first indication information in the MAC CE, the MAC CE also includes a first TCI state ID, and the first TCI state ID is used to identify the first TCI state. The first TRP is an example of at least one TRP in S410, the first indication information indicates the first TRP corresponding to the first TCI state ID, and the first TCI state is an example of the TCI state corresponding to at least one TRP.

The first indication information may be a logical channel identifier (LCID) of the MAC CE as shown in Table 1.

TABLE 1

| Index | LCID values |
|---|---|
| 0 | Common Control Channel (CCCH) |
| 1-32 | Identity of the Logical Channel |
| 33-45 | Reserved |
| 46 | TCI State Activation/Deactivation for UE-specific PDSCH MAC CE for TRP#1 |

TABLE 1-continued

| Index | LCID values |
|---|---|
| 47 | Recommended Bit Rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH for TRP#0 |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octet) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

In Table 1, index 0 to index 63 represent different LCID values, and different LCID values have different meanings. If the first information is the LCID value corresponding to index 46, the terminal device activates or deactivates the TCI state of TRP #1 according to the UE-specific PDSCH MAC CE; if the first information is the LCID value corresponding to index 53, the terminal device activates or deactivates the TCI state of TRP #0 according to the UE-specific PDSCH MAC CE; if the first information is the LCID value corresponding to the index 46 and the index 53, the terminal device activates or deactivates the TCI states of TRP #1 and TRP #0 according to the UE-specific PDSCH MAC CE. TRP #0 and TRP #1 are two examples of TRPs corresponding to the first TCI state.

The first indication information may also be bits in the MAC CE as shown in table 2.

TABLE 2

| R | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| ... | | | | | | | | |
| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

Table 2 is a table illustrating MAC CE. In Table 2, R is a reserved bit, which can be used as the first indication information, serving Cell ID is the identity of the serving cell, oct represents an octet, and T represents a bitmap of TCI state. When T is set to "1", it means that the TCI state is activated.

As an optional example, if the R bit in Table 2 is set to 0, it means that the MAC CE is used for TRP #0, and the terminal device can activate or deactivate the first TCI state of TRP #0; if the R bit in Table 2 is set to 1, it means that the MAC CE is used for TRP #1, and the terminal device can activate or deactivate the first TCI state of TRP #1.

In addition to the example, the first indication information may also be other fields in the MAC CE, such as the $C_i$ field in the MAC CE.

In Table 3, another MAC CE provided by the application is illustrated.

TABLE 3

| R | Serving Cell ID | BWP ID | Oct 1 |
|---|---|---|---|
| $C_0$ | TCI state $ID_{0,1}$ | | Oct 2 |
| R | TCI state $ID_{0,2}$ | | Oct 3 (Optional) |
| ... | | | |
| $C_N$ | TCI state $ID_{N,1}$ | | Oct M-1 |
| R | TCI state $ID_{N,2}$ | | Oct M (Optional) |

In Table 3, R is a reserved bit, Oct is an octet, and Optional is optional.

Serving Cell ID is the identity of the serving cell, and this field indicates the identity of the serving cell to which the MAC CE applies. The length of this field can be 5 bits.

BWP ID is the identity of the bandwidth part. This field indicates the downlink BWP applied by MAC CE, and the downlink BWP serves as the codepoint of the DCI bandwidth part indication field, as described in TS 38.212[9] (This field indicates a DL BWP for which the MAC CE applies as the codepoint of the DCI bandwidth part indicator field as specified in TS 38.212 [9]). The length of the BWP ID field can be 2 bits.

$C_0$ to CN are all $C_i$ fields, and the $C_i$ field can be used to indicate whether the TCI state $ID_{i,2}$ included in the octet exists. If this field is set to "1", the TCI state $ID_{i,2}$ included in the octet corresponding to this field exists. If this field is set to "0", the TCI state $ID_{i,2}$ included in the octet corresponding to this field does not exist.

TCI state $ID_{0,1}$, TCI state $ID_{0,2}$, TCI state $ID_{N,1}$ and TCI state $ID_{N,2}$ are TCI state $ID_{i,j}$ field. This field can be used to indicate the TCI state identified by the TCI-StateId specified by TS 38.331 [5], where i is the index of the codepoint of the DCI transmission configuration indication field specified in TS 38.212 [9], and j represents the index of TRP. The TCI codepoints mapped by the TCI states of TRP #0 and TRP #1 are determined by the sequential positions of TRP #0 and TRP #1 among all TCI codepoints having the TCI state $ID_{i,j}$ field, that is, the first TCI codepoint corresponding to TCI state $ID_{0,1}$ and TCI state $ID_{0,2}$ should be mapped to codepoint value 0, the second TCI codepoint corresponding to TCI state $ID_{1,1}$ and TCI state $ID_{1,2}$ should be mapped to codepoint value 1, and so forth. Based on the indication of the $C_i$ field, the TCI state ID (i.e., TCI state $ID_{1,2}$) used for TRP #1 is optional. The maximum number of activated TCI codepoints is 8, and the maximum number of TRPs is 2. TRP #0 and TRP #1 are two examples of TRPs corresponding to the first TCI state.

Optionally, the total number of activated TCI codepoints corresponding to the TCI state $ID_{i,j}$ field is at most 16, that is, one MAC CE can activate or deactivate at most 8 TCI states, and two TRPs can activate or deactivate at most 16 TCI states. Alternatively, the total number of activated TCI codepoints corresponding to the TCI state $ID_{i,j}$ field is at most 8.

According to Table 3, there can be two ways to indicate the TRP corresponding to the first TCI state.

Method One

The $C_i$ field indicates the number of activated or deactivated TCI states in the MAC CE. For example, when the $C_0$ field is set to 0, it means that the number of the TCI states activated or deactivated by the MAC CE is 1. When the $C_0$ field is set to 1, it means that the number of the TCI states activated or deactivated by the MAC CE is greater than one. The R bit in the upper left corner of Table 3 is used in the prior art to indicate that the MAC CE is used for a uni-TRP or multi-TRP. Meanwhile, the R bit is multiplexed to indicate the TRP corresponding to the TCI state ID immediately adjacent to the $C_0$ field, that is, when the $C_0$ field is set to 0, the different values of the R bit indicate the TRP corresponding to the TCI state ID immediately adjacent to the $C_0$ field.

For example, when the R bit is set to 0, and when the $C_0$ field is set to 0, it means that the MAC CE shown in Table 3 is used to activate or deactivate the first TCI state of TRP #0, i.e, TCI state $ID_{0,1}$.

In another example, when the R bit is set to 1, and when the $C_0$ field is set to 0, it means that the MAC CE shown in Table 3 is used to activate or deactivate the first TCI state of TRP #1, i.e., TCI state $ID_{0,1}$.

In the two examples, the R bit may be referred to as the first field, the $C_i$ field may be referred to as the second field, and the R bit and the $C_i$ field together form the first indication information in the MAC CE. The TRPs in the two examples may also be TRPs other than TRP #0 and TRP #1.

When the $C_0$ field is set to 1, it means that the MAC CE shown in Table 3 is used for multi-TRP. Meanwhile, TCI state $ID_{0,1}$ and TCI state $ID_{0,2}$ correspond to the two TRPs one-to-one according to preset rules. For example, TCI state $ID_{0,1}$ corresponds to TRP #0, TCI state $ID_{0,2}$ corresponds to TR P#1, and the terminal device determines the first TCI state to activate TRP #0 and TRP #1 according to the $C_0$ field set to 1 (i.e., the TCI state identified by TCI state $ID_{0,1}$ and TCI state $ID_{0,2}$).

In this example, the $C_0$ field may be referred to as the first indication information, and the first TCI state ID includes two IDs, namely, TCI state $ID_{0,1}$ and TCI state $ID_{0,2}$.

Method Two

The $C_i$ field or R bit indicates the TRP corresponding to the subsequent TCI state field that follows.

For example, when the $C_0$ field is set to 0, it means that the subsequent TCI state $ID_{0,1}$ field is used for TRP #0, and when the $C_0$ field is set to 1, it means that the subsequent TCI state $ID_{0,1}$ field is used for TRP #1.

In another example, when the R bit in Oct3 is set to 0, it means that the subsequent TCI state $ID_{0,2}$ field is used for TRP #0, and when the R bit in Oct3 is set to 1, it means that the subsequent TCI state $ID_{0,2}$ field is used for TRP #1.

In yet another example, when the $C_0$ field is set to 0, it means that the subsequent TCI state $ID_{0,1}$ field is used for TRP #0, and when the R bit in Oct3 is set to 1, it means that the subsequent TCI state $ID_{0,2}$ field is used for TRP #1.

In Table 3, the $C_0$ field can be referred to as a first $C_i$ field, and the CN field can be referred to as the second $C_i$ field; the R bit in Oct3 can be referred to as a first reserved bit, and the R bit in OctM can be referred to as a second reserved bit. The first reserved bit or the first $C_i$ field may be referred to as the first indication information, and the second reserved bit or the second $C_i$ field may be referred to as second indication information.

In the above paragraphs, examples of the methods for activating or deactivating the TCI state provided in the application are introduced in detail. It can be understood that, to implement the functions, the device for activating or deactivating the TCI state includes hardware structures and/or software modules corresponding to each function. Those skilled in the art should easily realize that in combination with the units and algorithm steps of the examples described in the embodiments disclosed herein, the application can be implemented in the form of hardware or a combination of hardware and computer software. Whether a certain function is executed by hardware or computer software-driven hardware depends on the specific application and design constraint conditions of the technical solution. Professionals and technicians can use different methods for each specific application to implement the described functions, but such implementation should not be considered beyond the scope of the application.

The application can divide functional units of devices that activate or deactivate the TCI state according to the method examples. For example, each function can be divided into functional units, or two or more functions can be integrated into one unit. The integrated unit can be implemented in the form of hardware or software functional unit. Note that the division of units in the application is illustrative and is only a logical function division, and there may be other division methods in actual implementation.

Figure 5:
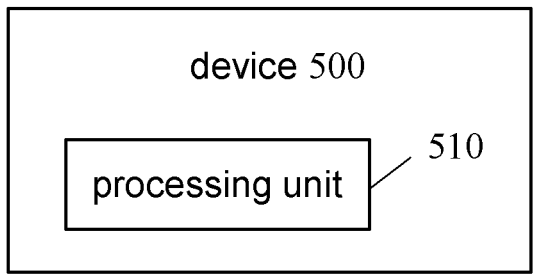
FIG. 5 is a schematic view of a device for activating or deactivating a TCI state according to the application.

FIG. 5 is a schematic view of a structure of a device for activating or deactivating a TCI state according to the application. The device 500 includes a processing unit 510.

The processing unit 510 is for obtaining first information used to determine at least one TRP corresponding to a MAC CE and to activate or deactivate a TCI state corresponding to the at least one TRP according to the MAC CE.

Optionally, the first information is an ID of a CORESET pool, and the CORESET pool is used to schedule the MAC CE.

Optionally, the first information includes the first indication information in the MAC CE, the MAC CE also includes a first TCI state ID, the first TCI state ID is used to identify the first TCI state, the first TCI state belongs to the TCI state corresponding to the at least one TRP, the first indication information indicates the first TRP corresponding to the first TCI state ID, and the first TRP belongs to the at least one TRP.

Optionally, the first indication information is the LCID of the MAC CE.

Optionally, the first indication information is the first reserved bit in the MAC CE.

Optionally, the first indication information is the first $C_i$ field in the MAC CE.

Optionally, the MAC CE further includes the second indication information in the MAC CE, the MAC CE also includes a second TCI state ID, the second TCI state ID is used to identify a second TCI state, the second TCI state belongs to the TCI state corresponding to the at least one TRP, the second indication information is used to indicate the second TRP corresponding to the second TCI state ID, and the second TRP belongs to the at least one TRP.

Optionally, the second indication information is the second reserved bit in the MAC CE.

Optionally, the second indication information is the second $C_i$ field in the MAC CE.

Optionally, the first indication information includes a first field and a second field, the first field indicates that the MAC CE corresponds to a uni-TRP or multi-TRP, and the second field indicates the number of activated or deactivated TCI states in the MAC CE.

When the first field indicates that the MAC CE corresponds to a uni-TRP, and when the second field indicates that the number of activated or deactivated TCI states in the MAC CE is 1, the TRP corresponding to the first TCI state is the first TRP.

When the first field indicates multiple TRPs corresponding to the MAC CE, and when the second field indicates that the number of activated or deactivated TCI states in the MAC CE is 1, the TRP corresponding to the first TCI state is the second TRP.

Optionally, the first field is the reserved bit in the MAC CE, and the second field is the $C_i$ field in the MAC CE.

Optionally, the first TCI state ID includes multiple TCI state IDs, the first indication information indicates the TRP corresponding to the first TCI state ID, which includes that the first indication information indicates the multiple TRPs corresponding to the multiple TCI state IDs.

Optionally, the first indication information is the $C_i$ field in the MAC CE.

For the specific implementation of the method for activating or deactivating the TCI state by the device 500 and the beneficial effects generated, refer to the related description in the method embodiments.

Figure 6:
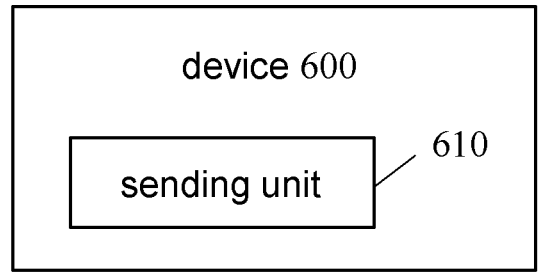
FIG. 6 is a schematic view of another device for activating or deactivating a TCI state according to the application.

FIG. 6 is a schematic view of a structure of another device for activating or deactivating a TCI state according to the application. The device 600 includes a sending unit 610.

The sending unit 610 is used for sending first information for the terminal device to determine the TRP corresponding to the MAC CE, so that the terminal device activates or deactivates the transmission configuration indicator (TCI) state corresponding to the at least one TRP according to the MAC CE.

Optionally, the first information is an ID of a CORESET pool, and the CORESET pool is used to schedule the MAC CE.

Optionally, the first information includes the first indication information in the MAC CE, the MAC CE also includes a first TCI state ID, the first TCI state ID is used to identify the first TCI state, the first TCI state belongs to the TCI state corresponding to the at least one TRP, the first indication information is used to indicate the first TRP corresponding to the first TCI state ID, and the first TRP belongs to the at least one TRP.

Optionally, the first indication information is the LCID of the MAC CE.

Optionally, the first indication information is the first reserved bit in the MAC CE.

Optionally, the first indication information is the first $C_i$ field in the MAC CE.

Optionally, the first information further includes the second indication information in the MAC CE, the MAC CE also includes the second TCI state ID, the second TCI state ID is used to identify the second TCI state, the second TCI state belongs to the TCI state corresponding to the at least one TRP, the second indication information indicates the second TRP corresponding to the second TCI state ID, and the second TRP belongs to the at least one TRP.

Optionally, the second indication information is the second reserved bit in the MAC CE.

Optionally, the second indication information is the second $C_i$ field in the MAC CE.

Optionally, the first indication information includes a first field and a second field, the first field indicates that the MAC CE corresponds to a uni-TRP or multi-TRP, and the second field indicates the number of activated or deactivated TCI states in the MAC CE.

When the first field indicates that the MAC CE corresponds to a uni-TRP, and when the second field indicates that the number of activated or deactivated TCI states in the MAC CE is 1, the TRP corresponding to the first TCI state is the first TRP.

When the first field indicates that the MAC CE corresponds to multi-TRP, and when the second field indicates that the number of activated or deactivated TCI states in the MAC CE is 1, the TRP corresponding to the first TCI state is the second TRP.

Optionally, the first field is a reserved bit in the MAC CE, and the second field is a $C_i$ field in the MAC CE.

Optionally, the first TCI state ID includes multiple TCI state IDs, the first indication information indicates the TRP corresponding to the first TCI state ID, which includes the first indication information indicates multiple TRPs corresponding to the multiple TCI state IDs.

Optionally, the first indication information is the $C_i$ field in the MAC CE.

For the specific implementation of the method for activating or deactivating the TCI state by the device 600 and the beneficial effects generated, refer to the related description in the method embodiments.

Figure 7:
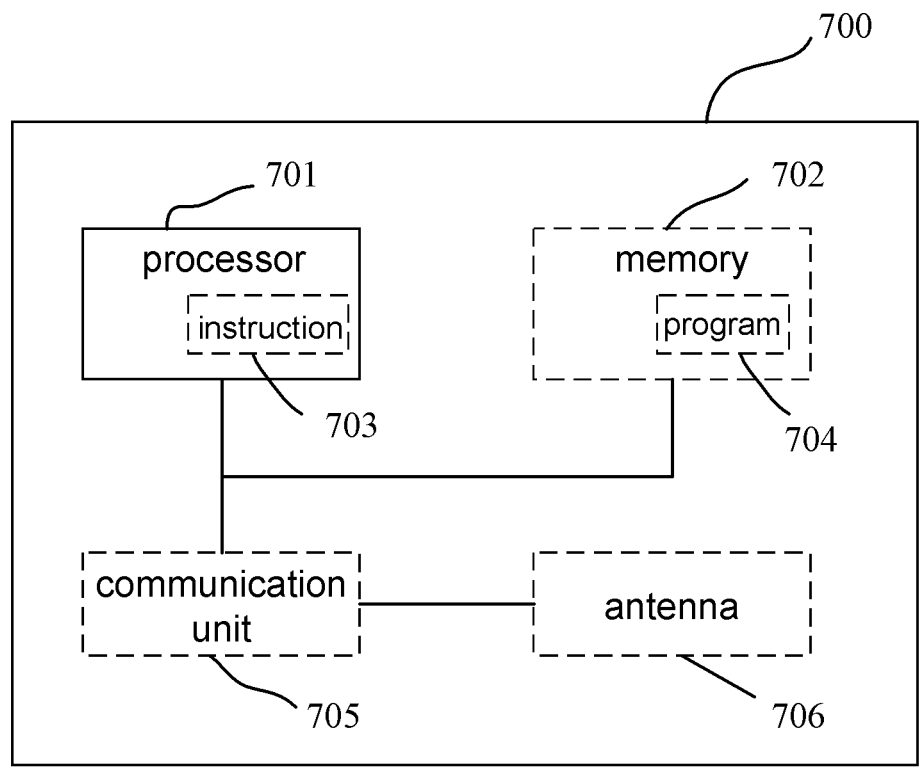
FIG. 7 is a schematic view of a communication device for activating or deactivating a TCI state according to the application.

FIG. 7 is a schematic view of a structure of a communication device according to the application. The dotted line in FIG. 7 indicates that the unit or the module is optional. The device 700 may be used to implement the methods described in the method embodiments. The device 700 may be terminal device, network device, or a chip.

The device 700 includes one or more processors 701, and the one or more processors 701 can support the device 700 to implement the methods in the method embodiments corresponding to FIG. 2 to FIG. 4. The processor 701 may be a general-purpose processor or a special-purpose processor. For example, the processor 701 may be a central processing unit (CPU). The CPU can be used to control the device 700, execute a software program, and process data of the software program. The device 700 may further include a communication unit 705 to implement signal input (reception) and output (transmission).

For example, the device 700 may be a chip, and the communication unit 705 may be an input and/or output circuit of the chip, or the communication unit 705 may be a communication interface of the chip, and the chip may be used as terminal device, network device, or a part of other wireless communication device.

In another example, the device 700 may be terminal device or network device, and the communication unit 705 may be a transceiver of the terminal device or the network device, or the communication unit 705 may be a transceiver circuit of the terminal device or the network device.

The device 700 may include one or more memories 702, and a program 704 is stored thereon. The program 704 can be run by the processor 701 to generate an instruction 703 so that the processor 701 executes the method described in the method embodiments according to the instruction 703. Optionally, data may also be stored in the memory 702. Optionally, the processor 701 may also access data stored in the memory 702. The data may be stored at a storage address same as that of the program 704, and the data may also be stored at a storage address different from that of the program 704.

The processor 701 and the memory 702 may be disposed separately or integrated together, such as being integrated on a system on chip (SOC) of terminal device.

The device 700 may also include an antenna 706. The communication unit 705 is used to implement the transceiver function of the device 700 through the antenna 706.

For the specific implementation of the method for activating or deactivating the TCI state by the processor 701, refer to the related description in the method embodiments.

It should be understood that each step of the method embodiments may be completed by a logic circuit in the form of hardware or instructions in the form of software in the processor 701. The processor 701 may be a CPU, a digital signal processor (DSP), an application specific integrated circuit (ASIC), a field programmable gate array (FPGA), or other programmable logic devices, such as discrete gates, transistor logic devices, or discrete hardware components.

The application also provides a computer program product. When executed by the processor 701, the computer program product implements the method described in any one of the method embodiments in the application.

The computer program product, such as the program 704, may be stored in the memory 702, and the program 704 is finally converted into an executable object file that can be executed by the processor 701 through processing processes, such as preprocessing, compilation, assembly, and linking.

The application also provides a computer-readable storage medium, and a computer program is stored thereon. When executed by a computer, the computer program implements the method described in any one of the method embodiments in the application. The computer program can be a high-level language program or an executable target program.

The computer-readable storage medium is the memory 702, for example. The memory 702 may be a volatile memory or a non-volatile memory, or the memory 702 may include both a volatile memory and a non-volatile memory. The non-volatile memory can be a read-only memory (ROM), a programmable ROM (PROM), an erasable PROM (EPROM), an electrically EPROM (EEPROM), or a flash memory. The volatile memory may be a random access memory (RAM), which is used as an external cache. By way of exemplary but not restrictive illustration, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM).

It is clear for those skilled in the art that for the convenience and conciseness of description, refer to the corresponding process and technical effects in the method embodiments for the specific working process and technical effects of the device and equipment, which are not iterated herein.

In the several embodiments provided in the application, the disclosed system, device, and method can be implemented in another way. For example, some features of the method embodiments described may be ignored or not implemented. The device embodiments described are merely illustrative. The division of units is only a logical function division. In actual implementation, there may be other division methods, and multiple units or components may be combined or integrated into another system. In addition, the coupling among the various units or the coupling among the various components may be direct coupling or indirect coupling, and the coupling includes electrical connection, mechanical connection, or other forms of connection.

It should be understood that in the various embodiments of the application, the size of the sequence number of each process is not equal to the order of execution. The execution order of each process should be determined by its function and internal logic and should not pose any limitation on the implementation process of the embodiments of the application.

In addition, the terms "system" and "network" in the specification are often used interchangeably in the specification. The term "and/or" in the specification is only an association relationship that describes associated objects, which means that there can be three relationships. For example, in the case of A and/or B, it can mean that there are three relationships: A exists alone, both A and B exist, or B exists alone. In addition, the punctuation mark "/" in the specification generally indicates that the associated objects before the slash and after the slash are in an "or" relationship.

In short, the descriptions are only preferred embodiments of the technical solutions of the application and are not intended to limit the protection scope of the application. Any modification, equivalent replacement, improvement, and the like made within the spirit and principle of the application shall be included in the protection scope of the application.

What is claimed is:

1. A method for activating or deactivating a transmission configuration indicator state, comprising:
   obtaining first information, wherein the first information is used to determine at least one transmission/reception point (TRP) corresponding to a medium access control (MAC) control element (CE);
   activating or deactivating a transmission configuration indicator (TCI) state corresponding to the at least one TRP according to the MAC CE, wherein the first information comprises first indication information in the MAC CE, the MAC CE further comprises a first TCI state ID, the first TCI state ID is used to identify a first TCI state, the first TCI state belongs to a TCI state corresponding to the at least one TRP, the first indication information is used to indicate a first TRP corresponding to the first TCI state ID, and the first TRP belongs to the at least one TRP,
   wherein when a first field of the first indication information indicates that the MAC CE corresponds to a single-TRP, and when a second field of the first indication information indicates that the number of activated or deactivated TCI states in the MAC CE is 1, a TRP corresponding to the first TCI state is the first TRP; or when the first field indicates that the MAC CE corresponds to a multi-TRP, and when the second field indicates that the number of activated or deactivated TCI states in the MAC CE is 1, the TRP corresponding to the first TCI state is a second TRP.

2. A device for activating or deactivating a transmission configuration indicator state, comprising a processor to carry out:

obtaining first information, wherein the first information is used to determine at least one transmission/reception point (TRP) corresponding to a medium access control (MAC) control element (CE);

activating or deactivating a transmission configuration indicator (TCI) state corresponding to the at least one TRP according to the MAC CE, wherein the first information comprises first indication information in the MAC CE, the MAC CE further comprises a first TCI state ID, the first TCI state ID is used to identify a first TCI state, the first TCI state belongs to a TCI state corresponding to the at least one TRP, the first indication information is used to indicate a first TRP corresponding to the first TCI state ID, and the first TRP belongs to the at least one TRP, wherein when a first field of the first indication information indicates that the MAC CE corresponds to a single-TRP, and when a second field of the first indication information indicates that the number of activated or deactivated TCI states in the MAC CE is 1, a TRP corresponding to the first TCI state is the first TRP; or when the first field indicates that the MAC CE corresponds to a multi-TRP, and when the second field indicates that the number of activated or deactivated TCI states in the MAC CE is 1, the TRP corresponding to the first TCI state is a second TRP.

3. A device for activating or deactivating a transmission configuration indicator state, comprising a transceiver to carry out:

sending first information, wherein the first information is used for terminal device to determine at least one transmission/reception point (TRP) corresponding to a medium access control (MAC) control element (CE), so that the terminal device activates or deactivates a transmission configuration indicator (TCI) state corresponding to the at least one TRP according to the MAC CE, wherein the first information comprises first indication information in the MAC CE, the MAC CE further comprises a first TCI state ID, the first TCI state ID is used to identify a first TCI state, the first TCI state belongs to a TCI state corresponding to the at least one TRP, the first indication information is used to indicate a first TRP corresponding to the first TCI state ID, and the first TRP belongs to the at least one TRP, wherein when a first field of the first indication information indicates that the MAC CE corresponds to a single-TRP, and when a second field of the first indication information indicates that the number of activated or deactivated TCI states in the MAC CE is 1, a TRP corresponding to the first TCI state is the first TRP; or when the first field indicates that the MAC CE corresponds to a multi-TRP, and when the second field indicates that the number of activated or deactivated TCI states in the MAC CE is 1, the TRP corresponding to the first TCI state is a second TRP.

4. A terminal device, comprising a processor and a memory, wherein the memory is used to store a computer program, and the processor is used to call and run the computer program stored in the memory and execute the method according to claim 1.

5. A chip, comprising a processor used to call and run a computer program from a memory, so that an apparatus disposed with the chip executes the method according to claim 1.

6. A non-transitory computer-readable storage medium, used to store a computer program, wherein the computer program enables a computer to execute the method according to claim 1.

7. The method according to claim 1, wherein the first information is an identity (ID) of a control resource set (CORESET) pool, and the CORESET pool is used to schedule the MAC CE.

8. The device according to claim 2, wherein the first information is an identity (ID) of a control resource set (CORESET) pool, and the CORESET pool is used to schedule the MAC CE.

9. The device according to claim 3, wherein the first information is an identity (ID) of a control resource set (CORESET) pool, and the CORESET pool is used to schedule the MAC CE.

* * * * *